United States Patent [19]
Bukosky et al.

[11] Patent Number: 6,076,948
[45] Date of Patent: Jun. 20, 2000

[54] ELECTROMAGNETIC RADIATION EMITTING OR RECEIVING ASSEMBLY

[75] Inventors: Allen A. Bukosky; Daniel J. Mathieu, both of Sheboygan, Wis.

[73] Assignee: K. W. Muth Company, Inc., Sheboygan, Wis.

[21] Appl. No.: 09/181,575

[22] Filed: Oct. 28, 1998

[51] Int. Cl.[7] ............................................. B60R 1/08
[52] U.S. Cl. .................. 362/494; 362/135; 362/498; 362/499; 362/540; 362/545; 362/140; 362/241; 362/247; 40/219; 340/475; 340/478
[58] Field of Search .......................... 362/30, 135, 494, 362/498, 499, 540, 545, 800, 140, 143, 241, 243, 245, 247; 40/219, 202; 340/475, 478

[56] References Cited

U.S. PATENT DOCUMENTS

| | | | |
|---|---|---|---|
| 3,266,016 | 8/1966 | Maruyama et al. | 340/98 |
| 4,467,193 | 8/1984 | Carroll | 250/216 |
| 4,646,210 | 2/1987 | Skogler et al. | 362/142 |
| 4,916,430 | 4/1990 | Vu et al. | 340/463 |
| 5,014,167 | 5/1991 | Roberts | 362/83.1 |
| 5,059,015 | 10/1991 | Tran | 359/844 |
| 5,207,492 | 5/1993 | Roberts | 362/30 |
| 5,241,457 | 8/1993 | Sasajima | 362/80.1 |
| 5,303,130 | 4/1994 | Wei et al. | 362/83.1 |
| 5,313,335 | 5/1994 | Gray | 359/839 |
| 5,355,284 | 10/1994 | Roberts | 362/30 |
| 5,361,190 | 11/1994 | Roberts et al. | 362/61 |
| 5,371,659 | 12/1994 | Pastrick et al. | 362/83.1 |
| 5,402,103 | 3/1995 | Tashiro | 340/475 |
| 5,436,741 | 7/1995 | Crandall | 359/15 |
| 5,481,409 | 1/1996 | Roberts | 359/839 |
| 5,497,306 | 3/1996 | Pastrick | 362/83.1 |
| 5,528,422 | 6/1996 | Roberts | 359/583 |
| 5,788,357 | 8/1998 | Muth | 362/83.1 |
| 5,938,320 | 8/1999 | Crandall | 362/494 |

OTHER PUBLICATIONS

Hecht–Zajac, Optics, Addison–Wesley, p. 56, Feb. 1979.

*Primary Examiner*—Cassandra Spyrou
*Assistant Examiner*—Leo Boutsikaris
*Attorney, Agent, or Firm*—Wells, St. John, Roberts, Gregory & Matkin, P.S.

[57] ABSTRACT

An electromagnetic radiation emitting assembly is disclosed and which includes a supporting substrate having opposite first and second surfaces and having an area formed therein which allows electromagnetic radiation to pass therethrough; a reflector positioned adjacent to the second surface of the substrate and oriented in a given position relative to the area formed in the substrate; and an electromagnetic radiation emitter mounted on the second surface of the substrate and which emits a source of electromagnetic radiation which is reflected by the reflector through the area formed in the supporting substrate. An electromagnetic radiation receiver is also described.

55 Claims, 4 Drawing Sheets

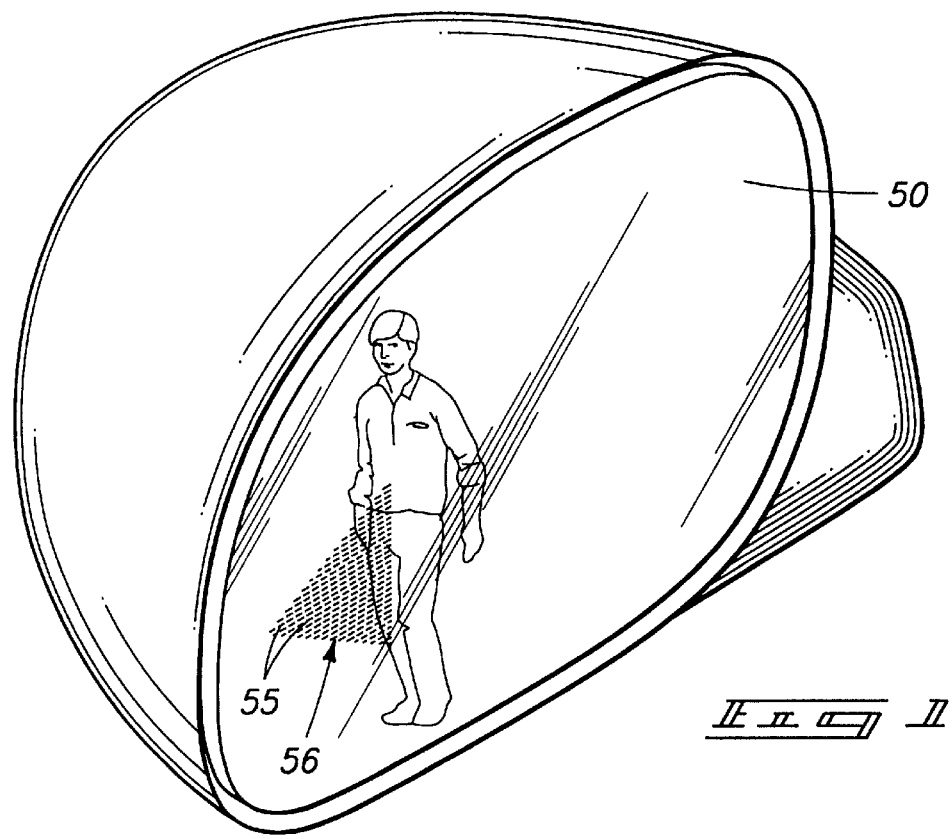
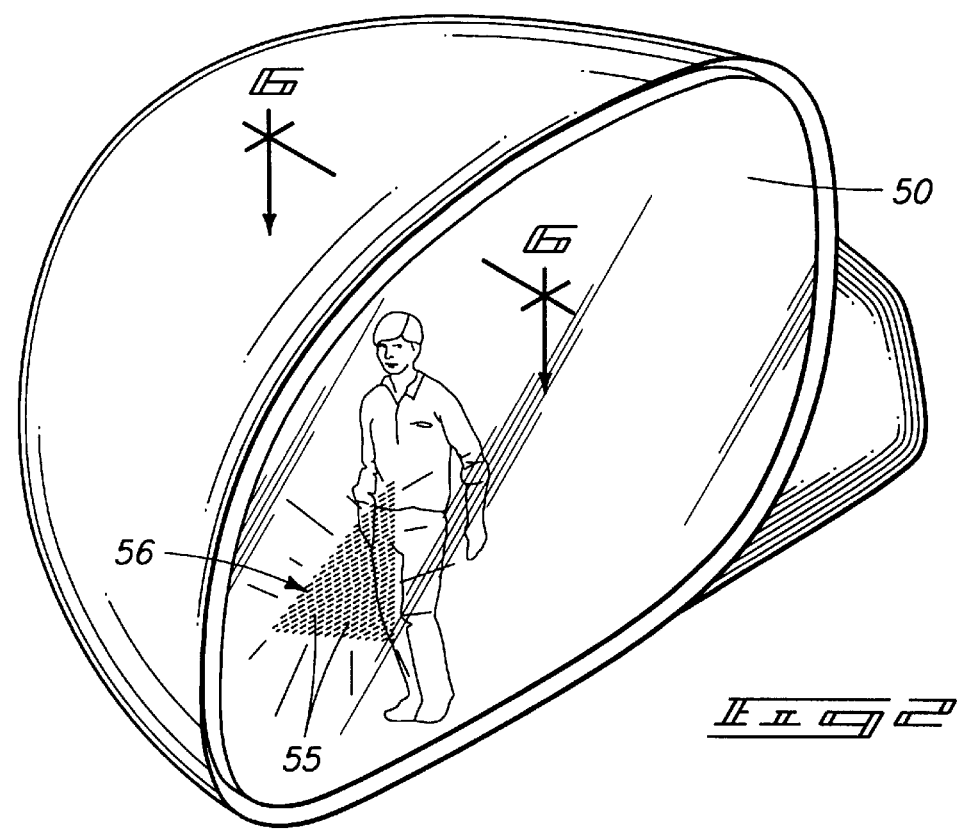

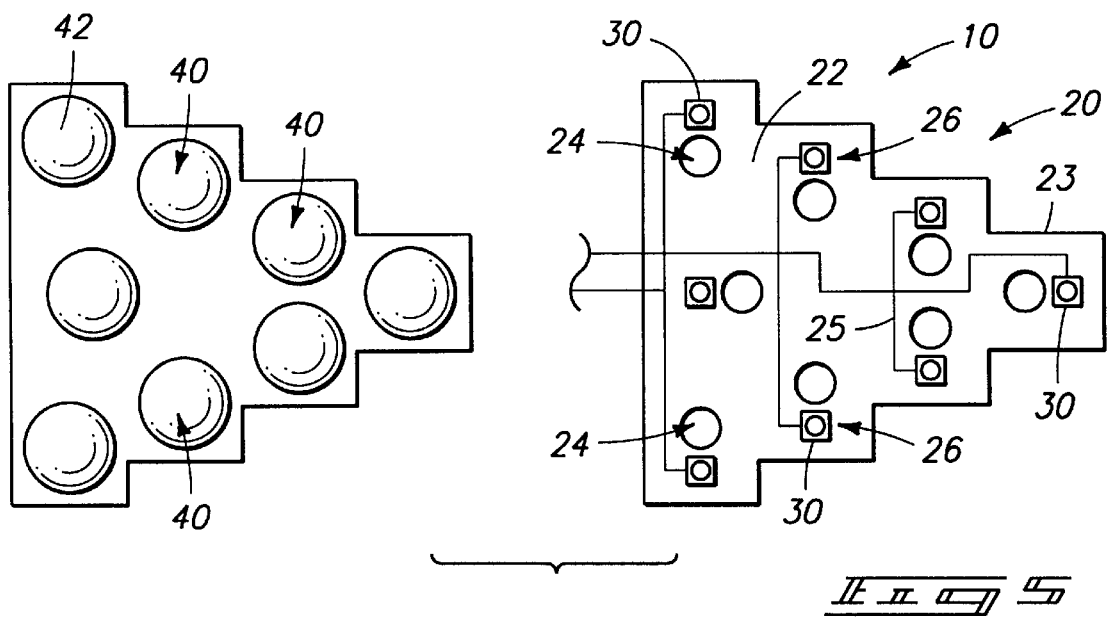
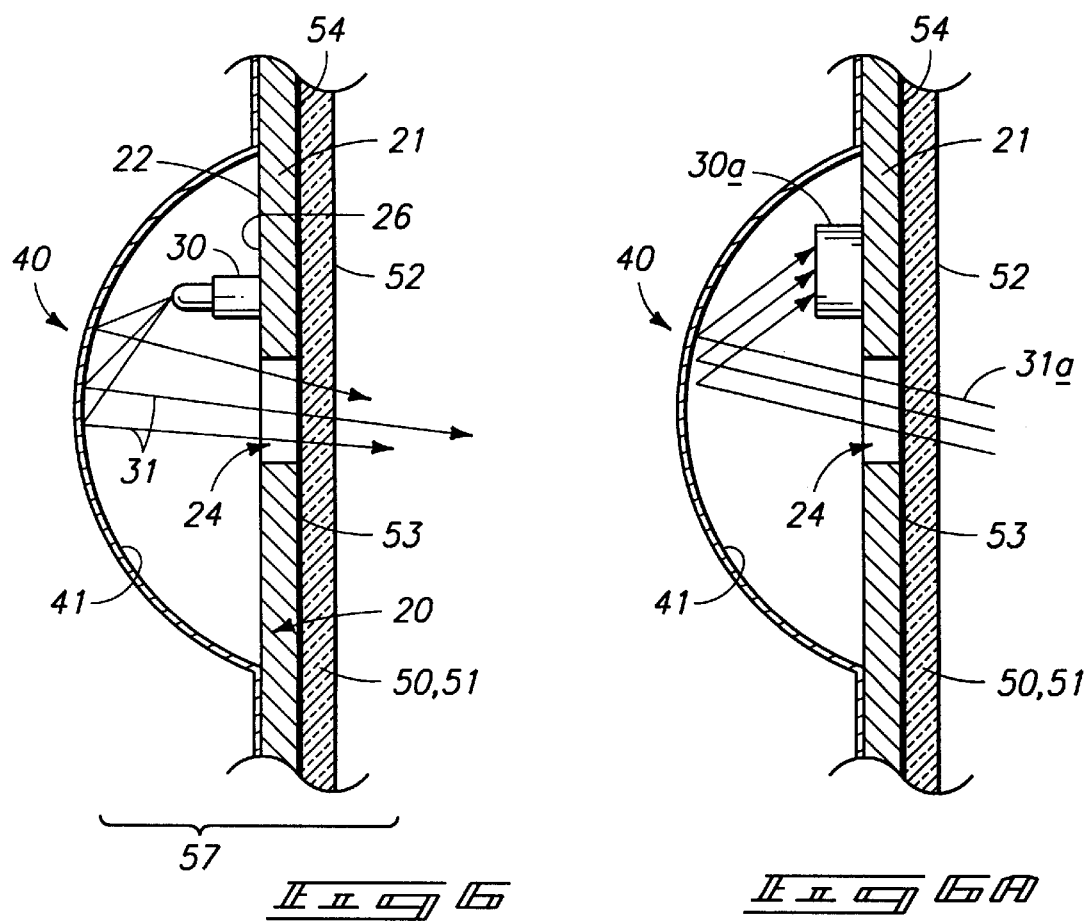

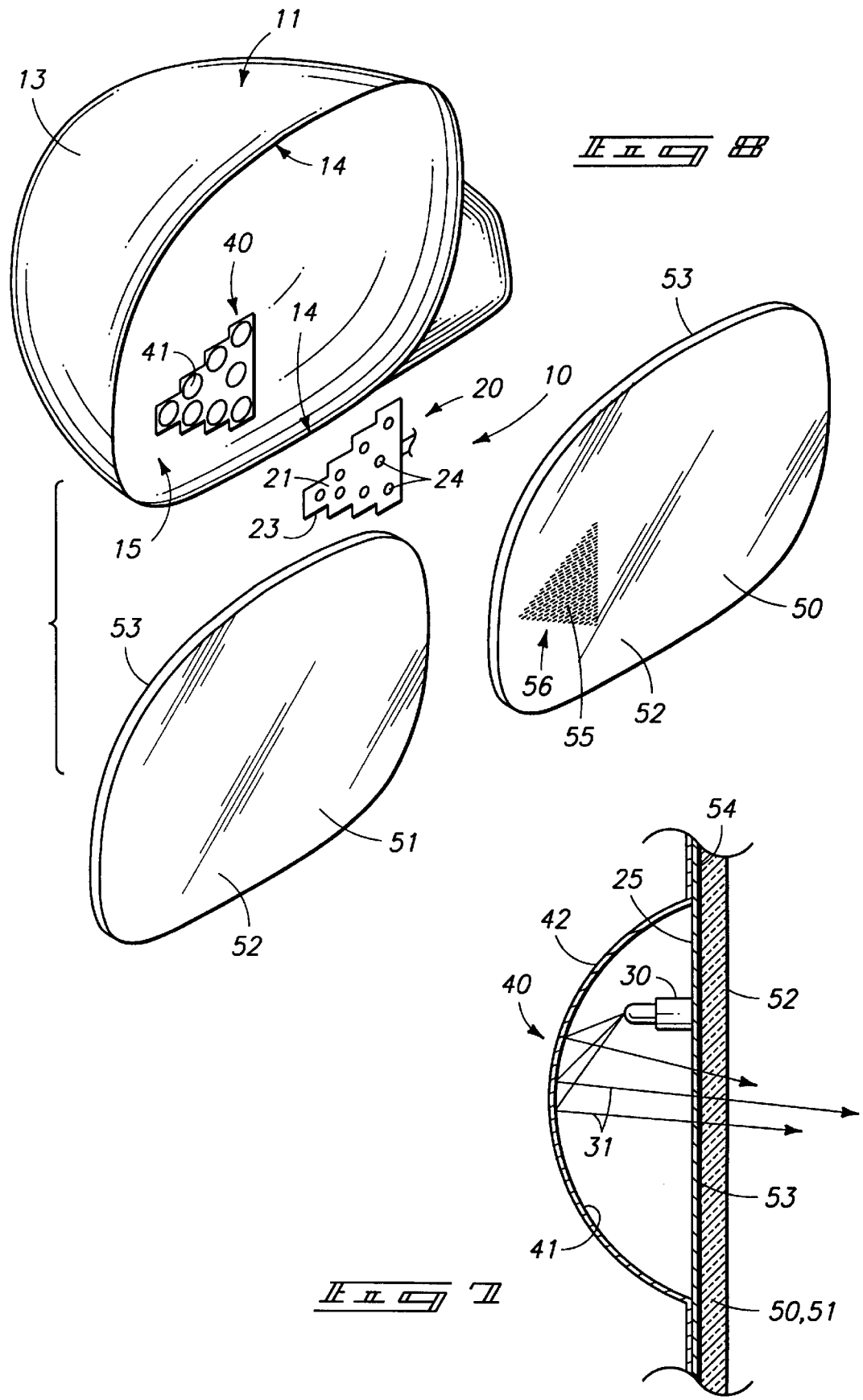

ELECTROMAGNETIC RADIATION EMITTING OR RECEIVING ASSEMBLY

TECHNICAL FIELD

The present invention relates to an electromagnetic radiation emitting or receiving assembly and more specifically, to an assembly which has particular utility when coupled with the controls of an overland vehicle, or the like, and which may, on the one hand, operate as a combined warning lamp and rear view mirror assembly, or further is operable to conceal a sensor which is responsive to a predetermined band of electromagnetic radiation.

DESCRIPTION OF THE PRIOR ART

The beneficial effects of employing auxiliary signaling assemblies have been disclosed in various United States patents, including U.S. Pat. Nos. 5,014,167; 5,207,492; 5,355,284; 5,361,190; 5,481,409; and 5,528,422, all of which are incorporated by reference herein. The mirror assemblies disclosed in the above-captioned patents employ a dichroic mirror which is operable to reflect a broad band of electromagnetic radiation, within the visible light portion of the spectrum, while simultaneously permitting electromagnetic radiation having wavelengths which reside within a predetermined spectral band to pass therethrough. In this fashion, the dichroic mirror remains an excellent visual image reflector, that is, achieving luminous reflectance which is acceptable for automotive and other industrial applications, for example, while simultaneously achieving an average transmittance in the predetermined spectral band of at least 58%. Further, when the predetermined band pass region is relatively narrow, that is, such as 30 nanometers or more, average in-band transmittance of 80% or more can be achieved with peak transmittance in excess of 90% being common.

In U.S. Pat. No. 5,528,422, a plurality of mirror coatings were disclosed and which are operable to conceal an underlying sensor or light-emitting assembly while simultaneously providing a neutral chromatic appearance. These same mirror coatings simultaneously absorb wavelengths of electromagnetic radiation which may otherwise be transmitted into the mirror assembly and which would, over time, degrade or otherwise be harmful to the subassembly which is concealed by the mirror assembly.

While the devices disclosed in these patents have realized some degree of commercial success, certain inherent physical characteristics of the earlier disclosed mirror assemblies have somewhat impeded manufacturing efforts to cost-effectively mass produce these same assemblies. For example, while the mirror coatings disclosed in U.S. Pat. No. 5,528,422 operate as described, the manufacturing difficulties and costs associated with producing these rather complex coatings with commercially available coating fabrication equipment has impeded the introduction of low cost products for the mass market. Yet further, as the size of mirror housings have decreased, the amount of available space within these same housings has become limited. Therefore, the size and weight of the enclosed light-emitting assembly or sensor has become a factor in the commercial introduction of the product.

Other devices have attempted to diverge from the teachings provided in the patents noted above. These devices, however, when built in accordance with their teachings, have been unable to provide the same performance characteristics. An example of such prior art is the patent to Crandall, U.S. Pat. No. 5,436,741. Other prior art references describe devices which attempt to provide the same functional benefits, as described in the earlier patents. These references describe all manner of mirror housing modifications, where for example, lamps are located in various orientations to project light into predetermined areas both internally, and/or besides the overland vehicle, and to further provide auxiliary signaling or warning capability. Examples of such include U.S. Pat. Nos. 4,646,210; 4,916,430; 5,059,015; 5,303,130; 5,371,659; 5,402,103; and 5,497,306 to name but a few.

Other prior art references have attempted to provide a combined mirror and signaling assembly. These assemblies have employed a nondichroic, semitransparent mirror. Perhaps the most germane patent which discloses this type of assembly is the patent to Maruyama et al U.S. Pat. No. 3,266,016. This reference is however devoid of any suggestion of how one would manufacture a device which would have both an acceptable reflectivity, and an acceptable luminous output, while simultaneously avoiding the detriments associated with the build up, and accumulation of heat within the mirror housing, and further being functional within the limited spacial area provided for by the same mirror housing.

In the present invention, the inventors have departed from the teachings of the prior art by providing an electromagnetic radiation emitting assembly which includes a mirror having a region through which electromagnetic radiation may pass; a substrate having opposite surfaces and which is juxtaposed relative to the mirror, the substrate having an area through which electromagnetic radiation may pass; an electromagnetic radiation emitter mounted on the surface the substrate which faces away from the mirror, the electromagnetic radiation emitter emitting a predetermined band of electromagnetic radiation; and a reflector mounted on the substrate and operable to reflect the electromagnetic radiation through the area formed in the substrate and the region of the mirror which allows the passage of electromagnetic radiation. The present invention, by avoiding the shortcomings of the previous prior art devices, provides an assembly which can be manufactured in a cost-effective fashion not possible heretofore, and which further has improved performance characteristics.

OBJECTS AND SUMMARY OF THE INVENTION

Therefore, one aspect of the present invention is to provide an improved electromagnetic radiation emitting or receiving assembly.

Another aspect of the present invention is to provide an assembly which may be manufactured and installed as original equipment on an overland vehicle or the like, or which may be further manufactured in the manner of a retrofit.

Another aspect of the present invention is to provide an assembly which may be readily installed or integrated with other mirror technologies such as motorized actuators, heater elements and films of various types, including diffractive, holographic, reflective and electrochromic devices of various designs.

Another aspect of the present invention is to provide an assembly which includes, in one form, a nondichroic, semitransparent mirror which passes about 1% to about 15% of a broad band of visibly discernible light and which reflects about 35% to about 58% of a broad band of visibly discernible light.

Another aspect of the present invention is to provide, in one form, an assembly which includes an electromagnetic radiation emitter positioned adjacent to a semitransparent, nondichroic mirror and which emits visible light which is passed by the semitransparent mirror, the luminous output of the mirror being about 2 to about 20 candelas.

Another aspect of the present invention is to provide, in one form, an assembly which includes an electromagnetic radiation emitter positioned adjacent to a semitransparent mirror, and which has a luminous output of about 80 candelas to about 900 candelas.

Another aspect of the present invention is to provide an assembly having an optical stack which is less than about 7 mm. in thickness, and weighs less than about 20 grams.

Yet a further aspect of the present invention is to provide an assembly having a mirror; and an electromagnetic radiation emitter comprising about 4 to about 30 light emitting diodes, the light emitting diodes having a luminous output of about 80 candelas to about 900 candelas.

Another aspect of the present invention is to provide an assembly which has an electromagnetic radiation emitter subcomponent which has a surface area of about 6 to about 127 square millimeters.

Another aspect of the present invention is to provide an assembly which is operable to obtain the individual benefits to be derived from related prior art assemblies and devices while avoiding the detriments individually associated therewith.

Further aspects and advantages are to provide improved elements and arrangements thereof in a mirror assembly for the purposes described and which is dependable, economical, durable and fully effective in accomplishing these intended purposes.

These and other aspects and advantages are achieved in an electromagnetic radiation emitting assembly as provided for hereinafter, the assembly comprising a mirror which passes about 1% to about 15% of a broad band of visible light, and which reflects about 35% to about 58% of a broad band of visible light; a substrate having opposite sides and which is positioned adjacent to the mirror, the substrate having an area through which electromagnetic radiation may pass; an electromagnetic radiation emitter positioned on the side of substrate which faces away from the mirror and which emits electromagnetic radiation which is passed by the mirror, the luminous output of the mirror being about 2 to about 20 candelas; and a reflector positioned near the substrate and which reflects the electromagnetic radiation through the substrate area and to the mirror where it passes therethrough.

BRIEF DESCRIPTION OF THE DRAWINGS

Preferred embodiments of the invention are described below with reference to the following accompanying drawings.

FIG. 1 is a perspective, plan view of one form of the invention in a deenergized state.

FIG. 2 is a perspective, plan view of one form of the invention in an energized state.

FIG. 5 is an exploded, plan view of a reflector, and electromagnetic radiation emitter of the present invention.

FIG. 6 is a fragmentary, traverse vertical sectional view of one form of the invention taken from a location along line 6—6 of FIG. 2.

FIG. 6A is a fragmentary, transverse vertical section view taken from a location along line 6—6 of FIG. 2.

FIG. 7 is a fragmentary, traverse, vertical sectional view of one form of the invention taken from a location along line 6—6 of FIG. 2.

FIG. 8 is a greatly simplified perspective exploded view of the present invention shown in a typical operational environment.

DETAILED DESCRIPTION OF THE PREFERRED EMBODIMENTS

Figure 3:
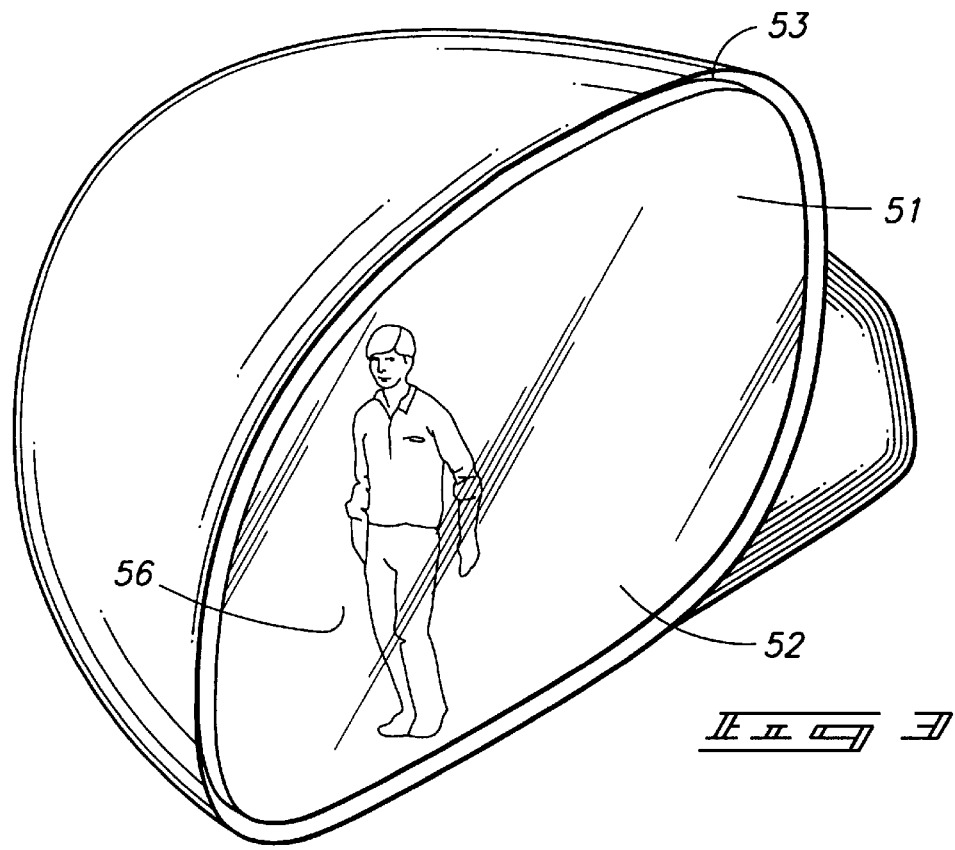
FIG. 3 is a perspective, plan view of one form of the invention in a deenergized state.

This disclosure of the invention is submitted in furtherance of the constitutional purposes of the U.S. Patent Laws "to promote the progress of science and useful arts" (Article 1, Section 8).

Referring more particularly to the drawings, the electromagnetic radiation emitting or receiving assembly of the present invention is generally indicated by the numeral 10 in FIG. 8. For illustrative convenience, the assembly 10 the present invention is described hereinafter as it would be configured if it were installed on an automobile (not shown) of conventional design. As discussed in the aforementioned prior art patents, which are incorporated by reference herein, the assembly 10 of the present invention may be mounted on the automobile in place of the rearview mirror which is located in the passenger compartment, and/or in place of the sideview mirrors which are mounted on the exterior surface of the vehicle. The assembly 10 of the subject invention will be discussed in greater detail in the paragraphs which follow.

The assembly 10, in one form, operates in combination with a mirror to provide a combined rearview mirror, and visual signaling device, and wherein a portion of the visual signal provided by same is capable of being seen from locations rearwardly of the vehicle and further cannot normally be seen under most circumstances by the operator of the same vehicle.

Still further, and in a second form of the invention, the present assembly 10 is operable to conceal an underlying sensor while simultaneously allowing the passage of a given band of electromagnetic radiation which may be detected by the underlying sensor. The features of both forms of the invention will now be described As best illustrated by reference to FIG. 8, the assembly 10 of the present invention is mounted in a housing which is generally indicated by the numeral 11. The housing is mounted at a predetermined location on the exterior portion of the overland vehicle, (not shown) in place of the traditional rearview or sideview mirrors which are employed with same. The housing 11 includes a substantially continuous sidewall 13. The sidewall 13 defines an aperture 14 of given dimensions. Further, the continuous sidewall 13 defines a cavity 15 which encloses the assembly 10.

Figure 4:
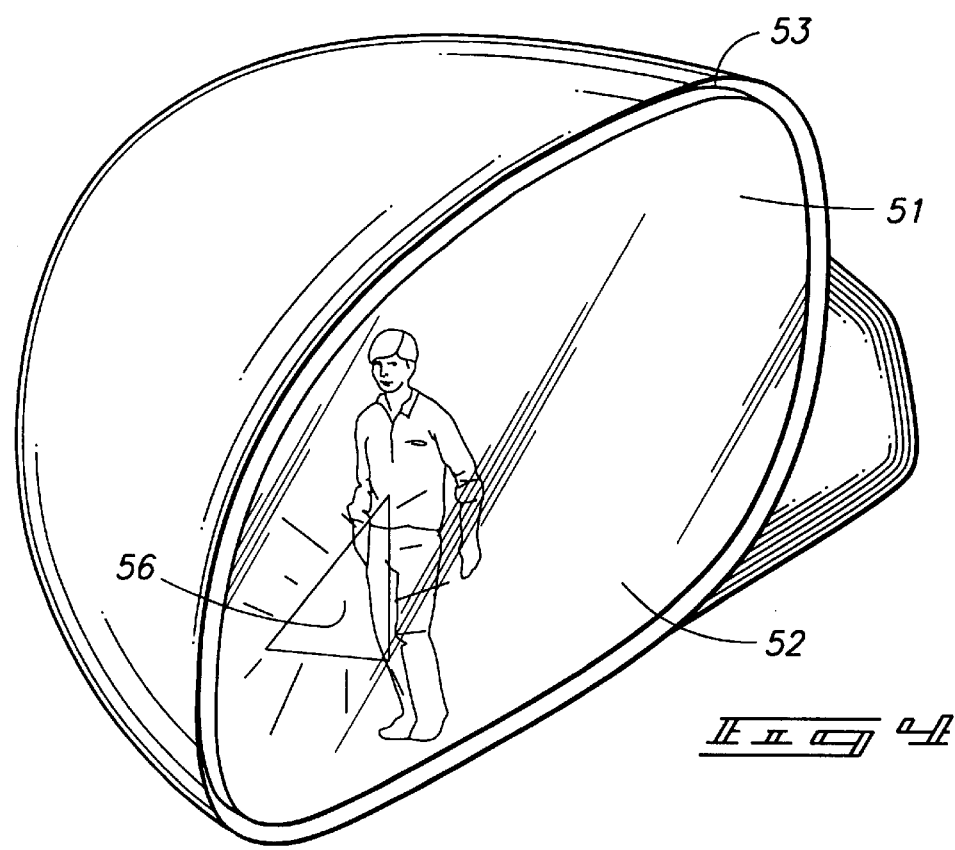
FIG. 4 is a perspective, plan view of one form of the invention in an energized state.

Referring now to FIG. 5, the assembly 10 includes a supporting substrate 20. The substrate 20 is substantially planar, although curved, and more angulated surface shapes are possible depending upon the end use. The supporting substrate is substantially opaque, although transparent or semitransparent substrates could also be employed. In the first form of the invention, the substrate 20 has a first surface 21, and an opposite second surface 22. Further, the supporting surface is defined by a peripheral edge 23. The supporting substrate 20 has a plurality of areas formed therein 24 which allows electromagnetic radiation to pass substantially unimpeded therethrough. In the present form of the invention, as illustrated, these areas 24 are depicted as apertures having given cross-sectional dimensions. The areas or apertures 24 are formed in the supporting substrate in a given pattern such that, in one form of the invention a recognizable symbol may be formed thereby (FIGS. 2 and 4). This symbol could be arrow-like, as shown, such that it could be used as a directional signalling lamp on an automobile, or further it could be formed into any desired alpha-numeric symbol for any given end use. As seen in FIG. 5, a plurality of electrically conductive pathways 25 are formed on the second surface 22. These conductive paths are connected to a suitable source of electricity, not shown. The individual electrically conductive paths 25 terminate at a given location 26 which is adjacent each of the respective apertures 24.

As seen in FIGS. 5 and 6, an electromagnetic radiation emitter 30 is mounted on the second surface of the substrate 22 and emits a source of electromagnetic radiation 31. The respective electromagnetic radiation emitters 30 are electrically coupled at the termination locations 26 to each of the respective electrically conductive paths 25 and to a source of electricity (not shown). Therefore, the electromagnetic radiation emitters 30 are mounted adjacent to the apertures, or areas 24 which allow electromagnetic radiation to pass therethrough.

As should be understood, the electromagnetic radiation emitter 30 comprises a plurality of light emitting diodes which may be energized as a group, or individually, depending upon the end use application. Yet further, a control circuit, including an ambient light sensor may be employed in a fashion to increase or decrease the luminous output of the respective light emitting diodes such that a resulting illuminated image may be visually discerned notwithstanding the intensity of the background ambient radiation which may be present. As illustrated in FIGS. 5 and 6, the electromagnetic radiation emitters 30 comprise about 4 to about 30 light emitting diodes. The light emitting diodes are operable to emit about 80 to about 900 candelas of visibly discernable electromagnetic radiation 31. The electromagnetic radiation emitted by the individual emitters 30 resides in a given band which is approximately 150 nanometers wide. As best seen in FIG. 6A, in an alternative form of the invention, an electromagnetic radiation receiver 30A may be located in place of the electromagnetic radiation emitter 30. The electromagnetic radiation receiver 30A is sensitive to a given band of radiation 31A and thereby produces a signal upon receiving same. This signal can be used in all manner of other applications including near object detection and sensing the surrounding ambient light intensity thereby controlling the output of the electromagnetic radiation emitters 30 as was discussed above, or other applications.

A reflector 40 is positioned adjacent to, or mounted on the second surface 22 of the substrate 20. The reflector 40 is oriented in a given position relative to the area 24 or aperture which is formed in the substrate 20, and through which electromagnetic radiation 31 can pass, such that it may reflect radiation 31 and 31A. As shown in FIGS. 6 and 6A, the reflector 40 has a highly polished or reflective inside facing surface 41 which is operable to reflect a preponderance of the electromagnetic radiation 31 or 31A which strikes the inside facing surface 41. The reflector 40 has an opposite, outside surface 42. The reflector 40 may be formed into a sheet such that a plurality of reflectors may be individually associated with each of the apertures 24 which are formed in the supporting substrate (FIG. 5). Alternatively, individual reflectors may be used. As seen in FIGS. 6 and 7, the individual reflectors 40 are positioned in substantially covering relation relative to the respective electromagnetic radiation emitters 30, or receivers 30A respectively, as the case may be. As seen in the drawings, the individual reflectors 40 are not concentrically positioned in covering relation relative to the respective emitters or receivers 30 and 30A, but rather, the electromagnetic radiation emitter or receiver is positioned to one side of the reflector. In this position, the reflector 40 is operable to reflect or receive the electromagnetic radiation 31 or 31A in or from a direction which is angularly displaced by at least about 20 degrees from the first surface 21 of the supporting substrate 20. As seen in FIG. 6, the reflector 40 is operable to collimate at least a portion of the electromagnetic radiation 31 and direct it through the individual apertures 24. Depending upon the amount of collimation, a given amount of electromagnetic radiation emitted may, in some cases, be outside the view of an operator of an overland vehicle (not shown). The reflectors may be manufactured in all sorts of configurations to achieve any degree of collimation desired.

Referring now to FIG. 8, a mirror, generally indicated by the numeral 50, is mounted in substantially occluding relation relative to the aperture 14 which is defined by the housing 11. As seen in this figure, the mirror 50 which may be employed, comprises a traditional reflector, that is, a transparent substrate, such as glass which is coated with a highly reflective material such as chromium or the like. On the other hand, a dichroic mirror 51 as was discussed in the previous prior art references may be utilized. Regardless of the mirror selected, the mirror has a first surface 52 and an opposite second surface 53. The second surface 53 is juxtaposed relative to the first surface 21 of the supporting substrate 20. A reflective surface coating 54 comprising chromium or a multilayer interference filter or the like is applied to the mirror 50 on the second surface 53 thereof. Although it is possible that the reflective surface could also be applied to first surface 52. This is represented by the heavier, darker line in FIGS. 6 and 7. Yet further and referring now to FIG. 7, it should be understood that it is conceivable that the plurality of electrically conductive paths 25 may be formed directly on the second surface 53 of the mirror. Similarly, it is conceivable that the electromagnetic radiation emitters may be directly fastened to the second surface 53 as seen in this same view. In this arrangement, the supporting substrate 20 would be eliminated.

Referring now to FIGS. 1, 2 and 6, a traditional mirror manufactured with a reflective surface coating 54 comprising chromium or the like, is shown and wherein a portion 55 of the reflective surface coating 54 has been removed to define a semitransparent region 56. This removal of a portion 55 of the reflective surface coating 54 may be achieved by various means such as by laser oblation; chemical mechanical polishing; and masking to name but a few. The removal of a portion of the reflective coating 54 may be complete in some applications, thereby forming small discreet apertures or windows therethrough which are formed in a predetermined pattern. In other applications, the removal may be only partial, thereby resulting in a thinner chromium coating in the given semitransparent region 56. The selective removal of the reflective surface coating defines a semitransparent mirror region 56 through which electromagnetic radiation may pass. It should be understood, however, that this same semitransparent mirror region 56 remains operable to simultaneously reflect at least about 35% of a broad band of visibly discernable electromagnetic radiation, and transmits at least 1% to about 15% of electromagnetic radiation emitted by the electromagnetic radiation emitter. This is illustrated in FIGS. 1 and 2 where the image of the individual depicted may continue to be visibly discerned in this semitransparent region. In FIGS. 1 and 2, the semitransparent region is shown as it would appear if the reflective surface coating is completed removed. On the other hand, a partial removal of the reflective surface coating may result in a mirror which appears substantially without blemish as is shown in FIGS. 3 and 4. The luminous output of the mirror 50 when measured at the semitransparent region 56 is about 2 to about 20 candelas. In an alternative form of the invention as seen in FIGS. 3, 4, and 8, the dichroic mirror 51 is mounted adjacent to the first surface of the supporting substrate 20 and passes a given band of electromagnetic radiation 31 while simultaneously reflecting a broad band of visibly discernable electromagnetic radiation. In this form of the invention, the electromagnetic radiation emitter 30 emits electromagnetic radiation 31 having a given band width which predominately lies within the same band of electromagnetic radiation which is passed by the dichroic mirror 51. As a result of this band width "matching", the mirror 51 achieves a luminous output of at least about 2 to about 20 candelas while simultaneously maintaining a reflectivity of at least 35 percent of a broad band of visibly discerning electromagnetic radiation. As can be seen in FIGS. 3, and 4, the dichroic mirror 51 does not reveal the underlying assembly 10, and further has no blemished appearance. When energized, as seen in FIG. 4, the visual image provided by the electromagnetic radiation assembly 10 can be seen clearly and unmistakably, while simultaneously providing a reflective surface which can be used by the operator. In addition, it should be recognized that other optical assemblies, such as all manner of light control, holographic and other light transmissive substrates may be positioned between the electromagnetic radiation emitter 20 and the second surface 53 of the mirror 50 to reflect or otherwise direct the electromagnetic radiation 31 along a predetermined path of travel.

OPERATION

The operation of the described embodiment of the present invention is believed to be readily apparent and is briefly summarized at this point.

In its broadest aspect, the present invention relates to an electromagnetic radiation emitting assembly 10 which comprises a supporting substrate 20 having opposite first and second surfaces 21 and 22, respectively, and having an area 24 formed therein which allows electromagnetic radiation 31 to pass therethrough; a reflector 40 positioned adjacent to the second surface of the substrate and oriented in a given position relative to the area formed in the substrate; and an electromagnetic radiation emitter 30 mounted on the second surface of the substrate and which emits a source of electromagnetic radiation 31 which is reflected by the reflector 40 through the area 24 formed in the supporting substrate.

The assembly 10 includes a means for conducting electricity 25. The electromagnetic radiation emitter 30 is energized by a source of electricity provided by the conducting means. The assembly 10 of the present invention further comprises a mirror 51 having a region 56 which allows a predetermined band of electromagnetic radiation to pass therethrough. As seen in FIG. 8, the mirror region 56 and the substrate area 24 are substantially aligned. The supporting substrate 20 is substantially opaque and in the preferred form of the present invention, the area 24 comprises an aperture having a given cross sectional area. The electromagnetic radiation emitter 30 is located near the aperture.

In one form of the invention (FIG. 7), the supporting substrate 20 can comprise a mirror, as shown in 50.

Further, in one form of the invention, the electromagnetic radiation emitter 30 emits electromagnetic radiation 31 in a given band, and the area 24 formed in the substrate passes a predominant portion of the given band of electromagnetic radiation emitted by the electromagnetic radiation emitter 30. Yet further, the mirror 50 may comprise a semitransparent dichroic mirror 51 which is mounted adjacent to the first surface 21 of the supporting substrate 20. The semitransparent dichroic mirror 51 passes a given band of electromagnetic radiation while simultaneously reflecting a broad band of visibly discernable electromagnetic radiation. The electromagnetic radiation emitter 30 emits electromagnetic radiation 31 having a given band width which predominantly lies within the same band of electromagnetic radiation which is passed by the semitransparent dichroic mirror 51.

As noted above, the present invention may comprise a mirror having a reflective surface coating 54 of which, a selective portion 55 of the reflective surface coating 54 is removed to define a semitransparent region 56. As such, the reflector 40 reflects the predominant portion of the electromagnetic radiation 31 emitted by the electromagnetic radiation emitter 30 in the direction of the semitransparent region 56. The semitransparent region 56 allows the emitted electromagnetic radiation to pass therethrough. It should be understood that the semitransparent region 56 of the mirror 50 reflects at least about 35% of a broad band of visibly discernable electromagnetic radiation and allows at least about 1% to about 20% of the electromagnetic radiation emitted by the electromagnetic radiation emitter 30 to pass therethrough. As noted earlier, the reflector 40 collimates a portion of the electromagnetic radiation 31 emitted by the electromagnetic radiation emitter 30 and reflects this same radiation in a direction which is angularly displaced by at least about 20% from the first surface 21 of the supporting substrate 20. In the preferred form of the invention, the electromagnetic radiation emitter 30 emits visibly discernable electromagnetic radiation 31 which is passed by the substrate 20 and the mirror 50, the luminous intensity or output of the electromagnetic radiation as detected at the semitransparent region 56 being about 2 to about 20 candelas. Further, the electromagnetic radiation emitter 30 comprises in the preferred form, about 4 to about 30 light emitting diodes which have a luminous output of about 80 to about 900 candelas, and wherein the electromagnetic radiation emitter 30, when energized, emits not more than about 16 watts of energy per square millimeter of surface area. As shown herein, the mirror 50, supporting substrate 20, and reflector 40 comprise an optical stack 57 which has a thickness dimension of less than about 7 millimeters; a weight of less than about 20 grams; and a surface area of about 6 to about 127 millimeters. As noted above, when utilized with a semitransparent dichroic mirror 51, the mirror is operable to pass a given band of electromagnetic radiation which is approximately 150 nanometers wide, and which is substantially matched to the band width of electromagnetic radiation emitted by the electromagnetic radiation emitters 30.

In a further alternative form of the invention, an electromagnetic radiation receiver 30A (FIG. 6A) may be substituted in place of the emitter 30. In this form of the invention, the electromagnetic radiation receiver 30A is mounted on the second surface 22 of the substrate 20 and which can detect a given band width of electromagnetic radiation which is passed by the supporting substrate and mirror and which is reflected by the reflector in the direction of the electromagnetic radiation receiver 30A. The other aspects of the mirror which are employed with the receiver, are substantially similar.

The present invention achieves benefits not provided for in the prior art. In particular, the present invention avoids the shortcomings and costs associated with the prior art practice of employing various types of refractive films and lens assemblies which are utilized to direct or otherwise bend the light into a given path such that it is outside the view of an operator. The present invention also provides design flexibility and decreased manufacturing costs not possible heretofore in an assembly which is highly efficient, compact, lightweight and cost effective to manufacture. The present assembly 10 can be incorporated into a signaling assembly which provides superior signaling capability for overland vehicles of various designs.

In compliance with the statute, the invention has been described in language more or less specific as to structural and methodical features. It is to be understood, however, that the invention is not limited to the specific features shown and described since the means herein disclosed comprise preferred forms of putting the invention into effect. The invention is therefore claimed in any of its forms or modifications within the proper scope of the appended claims appropriately interpreted in accordance with the Doctrine of Equivalents.

What is claimed is:

1. An electromagnetic radiation emitting assembly comprising:
   a supporting substrate having opposite first and second surfaces and having a first area formed therein which allows electromagnetic radiation to pass therethrough and a second area adjacent thereto which is substantially opaque;
   a reflector positioned adjacent to the second surface of the substrate and oriented in a given position relative to the first area formed in the substrate; and
   an electromagnetic radiation emitter mounted on the second surface of the substrate and which emits electromagnetic radiation which is reflected by the reflector through the first area formed in the supporting substrate and wherein the reflector is mounted in substantially eccentric reflecting relation relative to the electromagnetic radiation emitter.

2. An assembly as claimed in claim 1, wherein the substrate includes a means for conducting electricity, and the electromagnetic radiation emitter is energized by the electricity provided by the conducting means.

3. An assembly as claimed in claim 1, and further comprising a mirror having a region which allows a predetermined band of electromagnetic radiation to pass therethrough, and wherein the mirror region and the substrate area are substantially aligned.

4. An assembly as claimed in claim 1, wherein the first area formed in the substrate comprises an aperture having a given cross-sectional area, and wherein the electromagnetic radiation emitter is located near the aperture, and over the second area.

5. An assembly as claimed in claim 1, wherein the supporting substrate comprises a mirror.

6. An assembly as claimed in claim 1, wherein the electromagnetic radiation emitter emits electromagnetic radiation in a given band, and wherein the area formed in the substrate passes a predominate portion of the given band of electromagnetic radiation emitted by the electromagnetic radiation emitter.

7. An assembly as claimed in claim 1 and further comprising:
   a semitransparent dichroic mirror mounted adjacent to the first surface of the supporting substrate, and wherein the semitransparent mirror passes a given band of electromagnetic radiation while simultaneously reflecting a broad band of visibly discernable electromagnetic radiation; and wherein the electromagnetic radiation emitter emits electromagnetic radiation having a given band width which predominately lies within the same band of electromagnetic radiation which is passed by the semitransparent dichroic mirror.

8. An assembly as claimed in claim 1 further comprising:
   a mirror mounted adjacent to the first surface of the supporting substrate, the mirror having a reflective surface coating, and wherein a selective portion of the reflective surface coating is removed to define a semitransparent region, and wherein the reflector reflects the predominate portion of the electromagnetic radiation emitted by the electromagnetic radiation emitter in the direction of the semitransparent region, the semitransparent region allowing the emitted electromagnetic radiation to pass therethrough.

9. An assembly as claimed in claim 8, wherein the semitransparent region of the mirror reflects at least about 35% of a broad band of visibly discernible electromagnetic radiation.

10. An assembly as claimed in claim 8, wherein the semitransparent region formed in the mirror reflects at least about 35% of a broad band of visibly discernible electromagnetic radiation, and allows at least about 1% to about 20% of the electromagnetic radiation emitted by the electromagnetic radiation emitter to pass therethrough.

11. An assembly as claimed in claim 1, wherein the reflector collimates a portion of the electromagnetic radiation emitted by the electromagnetic radiation emitter.

12. An assembly as claimed in claim 1, wherein the reflector collimates a portion of the electromagnetic radiation emitted by the electromagnetic radiation emitter, and reflects the electromagnetic radiation in a direction which is angularly displaced by at least about 20° from the first surface of the supporting substrate.

13. An assembly as claimed in claim 1, wherein a plurality of discreet areas are formed in the supporting substrate and which allow electromagnetic radiation to pass therethrough, and wherein the reflector comprises a plurality of reflectors which are individually oriented in predetermined positions relative to each of the respective areas formed in the supporting substrate, and wherein the electromagnetic radiation emitter comprises a plurality of discreet emitters which are individually positioned adjacent each of the respective areas.

14. An assembly as claimed in claim 1, wherein the electromagnetic radiation emitter emits visibly discernable electromagnetic radiation which is passed by the substrate, the luminous intensity of the electromagnetic radiation assembly being about 2 to about 20 candelas.

15. An assembly as claimed in claim 14, wherein the electromagnetic radiation emitter comprises about 4 to about 30 light emitting diodes.

16. An assembly as claimed in claim 1, and further comprising a mirror having a discreet semitransparent region formed therein, and wherein the electromagnetic radiation emitter comprises about 4 to about 30 light emitting diodes which emit visibly discernable electromagnetic radiation, and further has a luminous output of about 80 to about 900 candelas, and wherein the visibly discernable electromagnetic radiation passes through the area formed in the substrate and the semitransparent region formed in the mirror, and wherein the luminous output of visibly discernable electromagnetic radiation emitted by the mirror is about 2 to about 20 candelas.

17. An assembly as claimed in claim 16, wherein the mirror reflects a broad band of visibly discernable electromagnetic radiation, and wherein the semitransparent region of the mirror reflects at least about 35% of the same broad band of visibly discernable electromagnetic radiation.

18. An assembly as claimed in claim 17, wherein the semitransparent region of the mirror passes about 1% to about 20% of the broad band of visibly discernable electromagnetic radiation, and wherein the electromagnetic radiation emitter, when energized emits not more than about 16 watts of energy per square millimeter of surface area.

19. An assembly as claimed in claim 18, wherein the mirror, supporting substrate, and reflector comprise an optical stack which has a thickness dimension of less than about 7 mm., a weight of less than about 20 grams, and a surface area of about 6 to about 127 square millimeters.

20. An electromagnetic radiation emitting assembly comprising:
- a mirror having opposite surfaces and a region through which electromagnetic radiation may pass, and an area adjacent thereto which is substantially opaque;
- a substrate having opposite surfaces, and which is mounted adjacent to one of the mirror surfaces, the substrate having an area through which electromagnetic radiation may pass, and which is substantially aligned with the mirror region through which electromagnetic radiation may pass;
- an electromagnetic radiation emitter mounted on the surface of the substrate which faces away from the mirror, and adjacent to the area formed in the substrate which allows the passage of electromagnetic radiation, the electromagnetic radiation emitter emitting the electromagnetic radiation; and
- a reflector positioned in eccentric reflecting relation relative to the source of electromagnetic radiation, the reflector directing the source of electromagnetic radiation through the substrate area, and mirror region through which electromagnetic radiation may pass.

21. An assembly as claimed in claim 20, wherein the substrate includes means for conducting electricity, and the electromagnetic radiation emitter is energized by the electricity provided by the conducting means.

22. An assembly as claimed in claim 20, wherein the mirror region is semitransparent and is operable to reflect at least about 35% of a broad band of visibly discernible electromagnetic radiation, and wherein the mirror region selectively passes a predominate portion of a given band of electromagnetic radiation while simultaneously reflecting the at least 35% of the broad band of visibly discernible electromagnetic radiation.

23. An assembly as claimed in claim 20, wherein the mirror has a reflective surface coating, and wherein a selective portion of the reflective surface coating is removed to define the region through which electromagnetic radiation may pass, and wherein the reflector reflects a predominate portion of the electromagnetic radiation in the direction of the mirror region, the mirror region simultaneously reflecting at least about 35% of a broad band of visibly discernable electromagnetic radiation.

24. An assembly as claimed in claim 20, wherein the mirror region transmits at least about 1% to about 15% of the electromagnetic radiation emitted by the electromagnetic radiation emitter, and wherein the luminous output of the mirror is about 2 to about 20 candelas.

25. An assembly as claimed in claim 20, wherein the reflector collimates a portion of the electromagnetic radiation emitted by the electromagnetic radiation emitter.

26. An assembly as claimed in claim 20, wherein the reflector collimates a portion of the electromagnetic radiation emitted by the electromagnetic radiation emitter, and reflects the electromagnetic radiation in a direction which is angularly displaced by at least about 20° relative to the opposite surfaces of the mirror.

27. An assembly as claimed in claim 20, wherein the mirror comprises a semitransparent dichroic mirror which passes a given band of electromagnetic radiation, while simultaneously reflecting a broad band of visibly discernable electromagnetic radiation, and wherein the electromagnetic radiation emitter emits electromagnetic radiation having a given band width which predominately lies within the same band of electromagnetic radiation passed by the semitransparent dichroic mirror.

28. An assembly as claimed in claim 27, wherein the given band of electromagnetic radiation passed by the semitransparent dichroic mirror is approximately 150 nanometers wide, and wherein the electromagnetic radiation emitter comprises about 4 to about 30 light emitting diodes which, when energized, has a luminous output of about 80 to about 900 candelas, and wherein the luminous output of the semitransparent mirror is about 2 to about 20 candelas.

29. An assembly as claimed in claim 28, wherein a predominate portion of the given band of electromagnetic radiation passed by the semitransparent dichroic mirror comprises visibly discernable electromagnetic radiation.

30. An electromagnetic radiation emitting assembly comprising:
- a mirror having a first surface and an opposite second surface, the mirror reflecting a broad band of visibly discernable electromagnetic radiation and further having a region through which electromagnetic radiation may pass therethrough, and wherein the mirror region reflects at least about 35% of the same broad band of visibly discernible electromagnetic radiation;
- a substrate having opposite first and second surfaces, and wherein the first surface of the substrate is juxtaposed relative to the second surface of the mirror, the substrate having an area formed therein which allows electromagnetic radiation to pass therethrough, the substrate area oriented in substantial alignment with the mirror region which allows the passage of electromagnetic radiation, and wherein the substrate renders the overlying mirror substantially opaque;
- an electromagnetic radiation emitter mounted on the second surface of the substrate, and emitting electromagnetic radiation; and
- a reflector positioned in eccentric relation relative to the second surface of the substrate and which reflects the source of electromagnetic radiation through the area of the substrate and the region of the mirror which allows the passage of electromagnetic radiation therethrough.

31. An assembly as claimed in claim 30, wherein the mirror comprises a semitransparent dichroic mirror which passes a given band of electromagnetic radiation while simultaneously reflecting the broad band of visibly discernable electromagnetic radiation, and wherein the predominate portion of the given band of electromagnetic radiation passed by the semitransparent dichroic mirror is about 150 nanometers wide, and is visibly discernable, and wherein the luminous output of the semitransparent dichroic mirror is about 2 to about 20 candelas.

32. An assembly as claimed in claim 30, wherein the mirror comprises a semitransparent dichroic mirror which passes a given band of electromagnetic radiation while simultaneously reflecting the broad band of visibly discernible electromagnetic radiation, and wherein the given band of electromagnetic radiation passed by the semitransparent dichroic mirror comprises visibly discernible electromagnetic radiation; and wherein the electromagnetic radiation emitter comprises about 4 to about 30 light emitting diodes; and wherein the electromagnetic radiation emitter has a luminous intensity of about 80 to about 900 candelas.

33. An assembly as claimed in claim 30, wherein the mirror includes a reflective surface coating, and wherein a selective portion of the reflective surface coating is removed to define the region of the mirror through which electromagnetic radiation may pass, and wherein the reflector reflects the predominate portion of the electromagnetic radiation in the direction of the mirror region.

34. An assembly as claimed in claim 33, wherein the reflective surface coating comprises chromium, and the selective removal comprises removing a portion of the chromium coating.

35. An assembly as claimed in claim 33, wherein the reflective coating comprises chromium, and wherein the chromium coating is completely removed, in a given pattern, thereby allowing electromagnetic radiation to pass therethrough.

36. An assembly as claimed in claim 30, wherein the reflector collimates a portion of the electromagnetic radiation emitted by the electromagnetic radiation emitter and reflects the electromagnetic radiation in a direction which is angularly displaced by at least about 20° from the first surface of the mirror.

37. An assembly as claimed in claim 20, wherein an electrical pathway is formed on the substrate and which electrically couples the electromagnetic radiation emitter with a source of electricity, and wherein the reflector is mounted on the second surface of the substrate and in substantially covering relation relative to the electromagnetic radiation emitter, and wherein the substrate, reflector, and electromagnetic radiation emitter have a combined thickness dimension of less than about 7 mm.; a weight of less than about 20 grams; and a surface area of about 6 to about 127 mm.

38. An assembly as claimed in claim 30, wherein the electromagnetic radiation emitter emits visibly discernible electromagnetic radiation, the electromagnetic emitter having a luminous output of about 80 to about 900 candelas; and wherein the mirror region has a luminous output of about 2 to about 20 candelas.

39. An assembly as claimed in claim 30, wherein the area formed in substrate comprises an aperture having given cross-sectional dimensions, and wherein the electromagnetic radiation emitter is positioned adjacent to the aperture.

40. An electromagnetic radiation emitting assembly for use in a signalling device which is mounted on an overland vehicle, comprising:
a housing mounted on the overland vehicle and which defines a cavity, and further having an aperture which permits access to the cavity;
a mirror mounted on the housing and disposed in substantially occluding relation relative to the aperture of the housing, the mirror reflecting a broad band of visibly discernible electromagnetic radiation, and further having a region which allows the passage of electromagnetic radiation therethrough, and a region that is adjacent thereto, the mirror region simultaneously reflecting at least about 35% of a broad band of visibly discernible electromagnetic radiation;
a substrate having opposite surfaces and which is mounted in juxtaposed relation relative to the mirror and positioned in the cavity, the substrate having means for conducting electricity to a location on the substrate, and wherein an aperture is formed in the substrate and adjacent to the location, and wherein the aperture is substantially aligned with the region of the mirror and which allows the passage of electromagnetic radiation therethrough, and wherein the substrate renders the overlying adjacent mirror region substantially opaque;
an electromagnetic radiation emitter mounted on the surface of the substrate which faces away from the mirror and at the location, the electromagnetic radiation emitter electrically coupled to the conducting means, and emitting visibly discernable electromagnetic radiation when energized and wherein the electromagnetic radiation emitter is mounted over the adjacent region of the mirror which is substantially opaque;
a reflector eccentrically mounted relative to the electromagnetic radiation emitter, and on the surface of the substrate facing away from the mirror, and which reflects the source of electromagnetic radiation through the aperture formed in the substrate and the mirror region, the source of electromagnetic radiation escaping the mirror housing at a given angular orientation relative to the mirror, and wherein the luminous output of the mirror region is about 2 to about 20 candelas.

41. An electromagnetic radiation receiving assembly, comprising:
a supporting substrate having opposite first and second surfaces and having an area formed therein which allows electromagnetic radiation to pass therethrough;
a reflector positioned adjacent to the second surface of the substrate and oriented in a given position relative to the area formed in the substrate; and
an electromagnetic radiation receiver mounted on the second surface of the substrate and which can detect a given band width of electromagnetic radiation which is passed by the supporting substrate and which is reflected by the reflector in the direction of the electromagnetic radiation receiver, and wherein the reflector is eccentrically oriented relative to the electromagnetic radiation receiver.

42. An assembly as claimed in claim 41, wherein the substrate includes a means for conducting an electrical signal, and wherein the electromagnetic radiation receiver is electrically coupled with the conducting means.

43. An assembly as claimed in claim 41, wherein the supporting surface is substantially opaque, and the area formed in the substrate comprises an aperture having a given cross-sectional area, and wherein the electromagnetic radiation receiver is located near the aperture.

44. An assembly as claimed in claim 41, wherein the substrate comprises a semitransparent mirror.

45. An assembly as claimed in claim 41, wherein the supporting surface is substantially opaque and the area formed in the supporting substrate comprises an aperture having a given cross-sectional area, and wherein a semitransparent mirror is juxtaposed the first surface of the supporting substrate, and which passes a predominate portion of the given band of electromagnetic radiation which may be detected by the electromagnetic radiation receiver.

46. An assembly as claimed in claim 45, wherein the given band of electromagnetic radiation passed by the mirror has a band width of about 150 nanometers, and wherein the mirror simultaneously reflects at least about 35% of a broad band of visibly discernible electromagnetic radiation.

47. An assembly as claimed in claim 41 and further comprising:

a mirror mounted adjacent to the first surface of the supporting substrate, the mirror having a reflective surface coating a portion of which is removed to define a semitransparent area, and wherein the semitransparent area passes the predominate portion of the electromagnetic radiation which may be detected by the electromagnetic radiation receiver, and wherein the semitransparent area and the area of the substrate which allows electromagnetic radiation to pass therethrough are substantially aligned.

48. An electromagnetic radiation receiving assembly, comprising:

a mirror having opposite surfaces, and a region through which electromagnetic radiation may pass;

a substrate having opposite surfaces, and which is mounted adjacent to one of the mirror surfaces, the substrate having an area though which electromagnetic radiation may pass, the substrate rendering the adjacent, and overlying mirror substantially opaque;

a electromagnetic radiation receiver mounted on the surface of the substrate which faces away from the mirror, and adjacent to the area formed in the substrate, and which allows the passage of electromagnetic radiation therethrough; and a reflector positioned in eccentric reflecting relation relative to the electromagnetic radiation receiver, the reflector reflecting electromagnetic radiation which passes through the region of the mirror and the substrate area in the direction of the electromagnetic radiation receiver.

49. An assembly as claimed in claim 48, wherein the mirror is semitransparent and is operable to uniformly reflect at least about 35% of a broad band of visibly discernible electromagnetic radiation while simultaneously passing a predetermined band of electromagnetic radiation which may be detected by the electromagnetic radiation receiver.

50. An assembly as claimed in claim 48, wherein the mirror has a reflective surface coating, a portion of which is removed to define the region through which electromagnetic radiation may pass, and wherein the area of the substrate is substantially aligned with region of the mirror through which electromagnetic radiation may pass, and wherein the mirror region simultaneously reflects at least about 35% of a broad band of visibly discernible electromagnetic radiation.

51. An assembly as claimed in claim 50, wherein the mirror region passes about 1% to about 20% of a predetermined band of electromagnetic radiation which may be sensed by the electromagnetic radiation receiver.

52. An electromagnetic radiation receiving assembly, comprising:

a mirror having a first surface and an opposite second surface, the mirror uniformly reflecting at least about 35% of a broad band of visibly discernable electromagnetic radiation and further having a region through which a predetermined band of electromagnetic radiation may pass, and a region adjacent thereto which is substantially opaque;

a substrate having opposite first and second surfaces, and wherein the first surface of the substrate is juxtaposed relative to the second surface of the mirror, the substrate having an area formed therein which allows electromagnetic radiation to pass therethrough, and wherein the area formed in the substrate is oriented in substantial alignment with the mirror region which allows the passage of electromagnetic radiation, and where the substrate renders the adjacent and overlying mirror substantially opaque;

an electromagnetic radiation receiver mounted on the second surface of the substrate, and over the region of the mirror which has been rendered opaque, and wherein the electromagnetic radiation receiver is responsive to a predetermined band width of electromagnetic radiation; and a reflector positioned adjacent to the second surface of the substrate and in eccentric relation relative to the electromagnetic radiation receiver to reflect the predetermined band width of electromagnetic radiation which passes through the mirror region and the substrate area in the direction of the electromagnetic radiation receiver.

53. An assembly as claimed in claim 52, wherein the mirror region passes a predominate portion of the predetermined band of electromagnetic radiation which may be sensed by the electromagnetic radiation receiver.

54. An assembly as claimed in claim 52, wherein the predetermined band width of electromagnetic radiation which may be sensed by the electromagnetic radiation receiver is about 150 nanometers wide.

55. An electromagnetic radiation emitting assembly, comprising:

a mirror having opposite surfaces, a region through which visible electromagnetic radiation may pass, and a region adjacent thereto which is substantially opaque with respect to the visible electromagnetic radiation;

a substrate having opposite surfaces, and which is mounted in juxtaposed relation to one of the mirror surfaces, the substrate having an area through which the visible electromagnetic radiation may pass and which is placed in substantial alignment with the region of the mirror through which the visible electromagnetic radiation may pass;

an electromagnetic radiation emitter for emitting a source of visible electromagnetic radiation which is mounted on the surface of the substrate which faces away from the mirror, and over the region of the mirror which is substantially opaque with respect to the visible electromagnetic radiation; and a reflector positioned in substantially eccentric reflecting relation relative to the electromagnetic radiation emitter, the reflector directing the source of electromagnetic radiation through the substrate area and the mirror region through which electromagnetic radiation may pass.

* * * * *